United States Patent
Andersen et al.

(10) Patent No.: US 9,932,483 B2
(45) Date of Patent: Apr. 3, 2018

(54) ADHESION PROMOTER FOR SOLVENTBORNE PRIMER SURFACERS

(71) Applicant: BASF Coatings GmbH, Muenster (DE)

(72) Inventors: Audree Andersen, Havixbeck (DE); Cathrin Corten, Shanghai (CN); Manuela Niemeier, Drensteinfurt (DE); Frederik Foelling, Muenster (DE); Simone Hesener, Muenster (DE); Nicole Freitag, Muenster (DE); Stefanie Boshe-Plois, Ochtrup (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 15/104,771

(22) PCT Filed: Dec. 17, 2014

(86) PCT No.: PCT/EP2014/078248
§ 371 (c)(1),
(2) Date: Jun. 15, 2016

(87) PCT Pub. No.: WO2015/091662
PCT Pub. Date: Jun. 25, 2015

(65) Prior Publication Data
US 2016/0312036 A1    Oct. 27, 2016

(30) Foreign Application Priority Data
Dec. 17, 2013  (EP) .................................... 13197695

(51) Int. Cl.
| | | |
|---|---|---|
| *B05D 7/14* | (2006.01) |
| *B05D 7/16* | (2006.01) |
| *C09D 167/06* | (2006.01) |
| *C09D 175/06* | (2006.01) |
| *C08K 5/5425* | (2006.01) |
| *C08G 18/68* | (2006.01) |
| *C08G 63/52* | (2006.01) |
| *C09D 5/00* | (2006.01) |
| *B05D 7/00* | (2006.01) |
| *C08G 63/695* | (2006.01) |
| *C08G 63/91* | (2006.01) |
| *C08G 18/62* | (2006.01) |
| *C08G 18/71* | (2006.01) |
| *C09D 175/04* | (2006.01) |
| *C08L 67/06* | (2006.01) |

(52) U.S. Cl.
CPC ............ *C09D 5/002* (2013.01); *B05D 7/14* (2013.01); *B05D 7/542* (2013.01); *B05D 7/544* (2013.01); *B05D 7/546* (2013.01); *C08G 18/6225* (2013.01); *C08G 18/68* (2013.01); *C08G 18/718* (2013.01); *C08G 63/52* (2013.01); *C08G 63/6958* (2013.01); *C08G 63/918* (2013.01); *C08K 5/5425* (2013.01); *C09D 167/06* (2013.01); *C09D 175/04* (2013.01)

(58) Field of Classification Search
CPC .......... B05D 7/14; B05D 7/544; B05D 7/542; C09D 5/002; C09D 167/06
USPC ...... 427/384, 387, 407.1; 522/104, 105, 106, 522/107, 108
See application file for complete search history.

(56) References Cited

U.S. PATENT DOCUMENTS

| | | |
|---|---|---|
| 5,091,465 A | 2/1992 | Dana et al. |
| 6,008,305 A | 12/1999 | Wang et al. |
| 6,048,579 A | 4/2000 | Wang et al. |
| 2007/0066766 A1 | 3/2007 | Chen et al. |
| 2008/0293908 A1 | 11/2008 | Ludewig et al. |
| 2010/0266758 A1 | 10/2010 | Vaes et al. |
| 2011/0130512 A1 | 6/2011 | Ludewig et al. |

FOREIGN PATENT DOCUMENTS

| | | | | |
|---|---|---|---|---|
| CA | 2631378 A1 * | 11/2008 | ............. | C08G 18/10 |
| EP | 0 432 748 A2 | 6/1991 | | |
| EP | 1 995 261 A1 | 11/2008 | | |
| EP | 1995261 A1 * | 11/2008 | ............. | C08G 18/10 |
| WO | 2008/067967 A2 | 6/2008 | | |
| WO | WO 2008067967 A2 * | 6/2008 | ......... | C08G 18/0823 |
| WO | 2009/086034 A1 | 7/2009 | | |

OTHER PUBLICATIONS

International Search Report dated Mar. 19, 2015 in PCT/EP2014/078248, filed Dec. 17, 2014.

* cited by examiner

*Primary Examiner* — William Phillip Fletcher, III
(74) *Attorney, Agent, or Firm* — Oblon, McClelland, Maier & Neustadt, L.L.P.

(57) ABSTRACT

The present invention relates to a solventborne primer surfacer which comprises at least one additive preparable by reacting at least one alpha,omega-hydroxy-functionalized oligoester which possesses an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10 000 g/mol, and at least one alkoxysilane which possesses an OH-reactive functional group, the sum of the weight percentage fractions of all additives of the invention being 0.5 to 10 wt %, based on the total amount of the solventborne primer surfacer. The present invention further relates to a process for producing multicoat paint systems, and to multicoat paint systems producible by means of said process. The invention further relates to the use of the additive identified above in solventborne primer surfacers for improving adhesion.

18 Claims, No Drawings

ADHESION PROMOTER FOR SOLVENTBORNE PRIMER SURFACERS

The invention relates to a solventborne primer surfacer. It further relates to a process for producing a multicoat paint system on a substrate, and to corresponding multicoat paint systems on a substrate. The present invention lastly relates to the use of the additives of the invention for improving adhesion in a solventborne primer surfacer.

PRIOR ART

The finish system on utility vehicles is subject to exacting requirements. In a typical system, over a metal substrate coated with an electrodeposition coating system, a primer surfacer coat and a topcoat have been applied. The topcoat typically unites the functions of a basecoat and a clearcoat with one another. A topcoat, accordingly, comprises pigments, for example, and so is responsible essentially for the overall colored appearance of the paint system. Moreover, it also possesses typical qualities characteristic of a clearcoat, such as a corresponding scratch resistance, for example. Typically both the primer surfacer and the topcoat are solventborne systems. Oftentimes the finishing of utility vehicles is not an automated procedure. In other words, the coating materials in question are applied by hand—that is, for example, by means of spray application. Primarily two-component paint systems are used in such cases, permitting curing at moderate temperatures. In a resultant paint finish, a major problem continues to be posed by the adhesion between primer surfacer coat and topcoat, and also by the adhesion between primer surfacer and substrate.

A comparable problem also arises in the context of automotive refinish. In automotive refinish, the painting outcome must be reproduced after an accident, or a finishing error must be remedied. An automotive paint system may be refinished, for example, by sanding down the damaged site and then applying a primer, a primer surfacer, a basecoat, and a clearcoat. The paint systems used in this context are different than in automotive OEM finishing. A key reason for this is that automotive refinish must be performed on a fully assembled and equipped automobile. Fully assembled and equipped automobiles, however, can be exposed to temperatures only of 60 up to a maximum of 100° C. Primarily, therefore, two-component paint systems are used which allow curing at these temperatures. Still a problem here is the adhesion between primer surfacer coat and basecoat, and the adhesion between primer surfacer and primer.

OBJECTIVE

It was an object of the present invention, therefore, to improve the adhesion between the primer surfacer coat and its adjacent coats. Such a primer surfacer is to be suitable for use both in the finishing of utility vehicles and in automotive refinish. In the case of the finishing of utility vehicles, the aim is to improve the adhesion between primer surfacer coat and topcoat and also the adhesion between primer surfacer and substrate. In the case of automotive refinish, the concern is to improve the adhesion between primer surfacer coat and basecoat and also the adhesion between primer surfacer and primer.

Solution According to the Invention

This object has surprisingly been achieved by means of a solventborne primer surfacer which comprises at least one additive preparable by reacting (a) at least one alpha,omega-hydroxy-functionalized oligoester which possesses an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10 000 g/mol, and (b) at least one alkoxysilane of the structural formula (II)

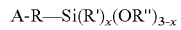

where
A is an OH-reactive functional group,
R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms,
the radical R' is selected from the group of $C_1$ to $C_{12}$ alkyl radicals,
R" is a methyl or ethyl radical, and
x is 0 to 2,
with the proviso that at least 90 mol % of all the OH groups of the alpha,omega-hydroxy-functionalized oligoester have been reacted with an OH-reactive functional group A, and, moreover, the sum of the weight percentage fractions of all additives of the invention is 0.5 to 10 wt %, based on the total amount of the solventborne primer surfacer.

Preferably at least 95 mol %, more preferably at least 97 mol %, and especially at least 99 mol %, and also 100 mol %, of all the OH groups of the alpha,omega-hydroxy-functionalized oligoester are reacted with an OH-reactive functional group A. The amount of the OH groups of the alpha,omega-hydroxy-functionalized oligoester that have been reacted with the OH-reactive functional groups A of the alkoxysilane (II) can be determined indirectly, for example, by determining the amount of the still unreacted OH-reactive functional groups A of the alkoxysilane (II).

Description of the Alpha,Omega-Hydroxy-Functionalized Oligoester

The term alpha,omega-hydroxy-functionalized oligoester identifies an oligoester on each of whose opposite ends, identified by alpha and omega respectively, there is a hydroxyl group. This means that at both ends an oligoester of this kind is terminated by a monomer unit carrying in each case precisely one hydroxyl group. Where the oligoester is branched, alpha and omega refer to the ends of the longest polymer chain in the monomer. This length is defined by the number of monomers incorporated. Nor is it impossible for the alpha,omega-hydroxy-functionalized oligoester to possess further hydroxyl groups. It is preferable for the alpha,omega-hydroxy-functionalized oligoester for use in accordance with the invention to possess precisely two hydroxyl groups, one in the alpha and one in the omega position. It is particularly preferable for the alpha,omega-hydroxy-functionalized oligoester for use in accordance with the invention to possess precisely two hydroxyl groups, one in alpha and one in omega position, and to also be linear.

The alpha,omega-hydroxy-functionalized oligoester for use in accordance with the invention possesses an OH number of preferably 40 to 160 mg KOH/g and more preferably of 70 to 150 mg KOH/g. The OH number may be determined in accordance with DIN 53240-2 (date: November 2007) as follows. The OH groups are reacted by acetylation with an excess of acetic anhydride. The excess acetic anhydride is subsequently cleaved by addition of water to form acetic acid, and the entire acetic acid is back-titrated with ethanolic KOH. The OH number indicates the amount of KOH in mg which is equivalent to the amount of acetic acid bound in the acetylation of 1 g of substance.

The alpha,omega-hydroxy-functionalized oligoester for use in accordance with the invention further possesses an acid number of preferably 0 to 10 mg KOH/g, more preferably 0 to 5 mg KOH/g, and very preferably 0 to 3 mg KOH/g. The acid number is determined in accordance with DIN EN ISO 2114 (date: June 2002). In this determination, the free acids present in the sample are titrated with a standard potassium hydroxide solution in the presence of a color indicator. The acid number corresponds to the mass of potassium hydroxide in mg which is needed to neutralize 1 g of alpha,omega-hydroxy-functionalized oligoester under specified conditions.

The alpha,omega-hydroxy-functionalized oligoester further possesses a preferred number-average molecular weight of 1000 to 2000 g/mol and more preferably of 1200 to 1800 g/mol and also a weight-average molecular weight of preferably 3000 to 8000 g/mol and more preferably 3000 to 6000 g/mol. The number-average and weight-average molecular weights are determined by gel permeation chromatography with tetrahydrofuran as eluent, using polystyrene standards, in accordance with DIN 55672-1 (date: August 2007). The column material consists of styrene-divinylbenzene copolymers.

It is essential to the invention that the alpha,omega-hydroxy-functionalized oligoester possesses a theoretical carbon-carbon double bond content of 1 to 2.5 mmol/g, preferably of 1.5 to 2 mmol/g, and more preferably of 1.6 to 1.9 mmol/g. The theoretical carbon-carbon double bond content refers to the amount of substance of the carbon-carbon double bonds, in the unit mmol, based on the mass of the alpha,omega-hydroxy-functionalized oligoester, in the unit gram. The theoretical carbon-carbon double bond content, referred to as double bond content in the formula depicted below, is calculated as follows:

$$\text{double bond content} = \frac{\text{amount of substance (double bonds)}}{\text{mass (oligoester)}}$$

Here, the expression "amount of substance(double bonds)" refers to the amount of substance of the carbon-carbon double bonds, in the unit mmol, and the expression "mass(oligoester)" refers to the mass of the alpha,omega-hydroxy-functionalized oligoester in the unit gram.

The mass of the alpha,omega-hydroxy-functionalized oligoester is the sum of the monomers used in its preparation, minus the mass of the water formed therein, on the assumption of complete conversion of all anhydride groups and carboxylic acid groups. The amount of substance of the carbon-carbon double bonds is given by the amount of substance of the unsaturated monomers employed. Where, for example, exclusively monounsaturated monomers are employed, such as maleic anhydride, for example, the amount of substance of the carbon-carbon double bonds is equal to the amount of substance of the unsaturated monomers employed. Where, for example, diunsaturated monomers are employed, the amount of substance of the carbon-carbon double bonds introduced by such monomers into the alpha,omega-hydroxy-functionalized oligoester is twice as large as the amount of substance of the corresponding diunsaturated monomer employed.

The alpha,omega-hydroxy-functionalized oligoester may be prepared, for example, from the reaction of polycarboxylic acids with polyols. It is preferably prepared from reaction of dicarboxylic acids and also their anhydrides and diols, triols, and monohydroxy-functional compounds. Diols are used with preference.

Where the alpha,omega-hydroxy-functionalized oligoester is prepared with dicarboxylic acids, it is in principle also possible to use their anhydrides. In the text below, therefore, the term dicarboxylic acid should be interpreted to likewise include the corresponding anhydride. Deciding to use the compounds in question either as dicarboxylic acid or as anhydride is part of the general knowledge of a person of ordinary skill in the art.

Dicarboxylic Acids

The dicarboxylic acids for use in accordance with the invention may be aromatic or aliphatic compounds. Aliphatic compounds are compounds which do not contain any aromatic groups, such as a benzene radical, for example. An aromatic compound in the sense of the present invention comprehends all those compounds which include at least one aromatic group, such as an optionally substituted phenyl radical, for example. Examples of an aromatic compound include, for example, the constitutional isomers of benzenedicarboxylic acid, which are known to the skilled person, and also terephthalic anhydride.

Aliphatic dicarboxylic acids are preferred. With particular preference, the aliphatic dicarboxylic acids are saturated or mono- or polyunsaturated. Especially preferred are linear aliphatic dicarboxylic acids, which are either saturated or mono- or polyunsaturated. Besides these, it is also possible to use cycloaliphatic dicarboxylic acids.

It is preferred, moreover, for at least one saturated and at least one mono- or polyunsaturated aliphatic dicarboxylic acid to be used.

Particular preference is given to using at least one saturated linear aliphatic dicarboxylic acid and at least one mono- or polyunsaturated linear aliphatic dicarboxylic acid. Particular preference is given to using precisely one saturated and precisely one mono- or polyunsaturated aliphatic dicarboxylic acid. Very particular preference is given to using precisely one saturated linear and precisely one mono- or polyunsaturated linear aliphatic dicarboxylic acid.

The molar ratio of saturated to mono- and/or polyunsaturated aliphatic dicarboxylic acids is preferably 0.5:1.5 to 1.5:0.5, particularly preferably 0.75:1.25 to 1.25:0.75 and very preferably 0.9:1.1 to 1.1:0.9. The stated ratios relate to cases both where more than one saturated and/or more than one unsaturated dicarboxylic acid are used, and where precisely one saturated and precisely one unsaturated dicarboxylic acid are used.

Saturated aliphatic dicarboxylic acids used are preferably those having 4 to 18, more preferably 6 to 14, and very preferably 6 to 10 carbon atoms. With particular preference these are linear saturated aliphatic dicarboxylic acids.

Monounsaturated aliphatic dicarboxylic acids used are preferably those having 4 to 10, more preferably 4 to 8, and very preferably 4 to 6 carbon atoms. With particular preference these are corresponding unsaturated linear aliphatic dicarboxylic acids.

Polyunsaturated aliphatic dicarboxylic acids used are preferably those having 6 to 18, more preferably 8 to 16, and very preferably 10 to 14 carbon atoms. With particular preference these are corresponding polyunsaturated linear aliphatic dicarboxylic acids.

The saturated aliphatic dicarboxylic acids are, for example, alkanedioic acids. Preference is given to using saturated alkanedioic acids which contain 4 to 18, more preferably 6 to 14, and very preferably 6 to carbon atoms.

With particular preference these are saturated linear alkanedioic acids which contain 4 to 18, more preferably 6 to 14, and very preferably 6 to carbon atoms. Suitable alkanedioic acids are, for example, succinic acid, glutaric acid, adipic acid, pimelic acid, suberic acid, azelaic acid, sebacic acid, undecanedioic acid, dodecanedioic acid, tridecanedioic acid, tetradecanedioic acid, and hexadecanedioic acid, and also their anhydrides, where the latter exist.

Monounsaturated aliphatic dicarboxylic acids which can be used are alkenedioic acids which contain 4 to 10, more preferably 4 to 8, and very preferably 4 to 6 carbon atoms. Preferably these are corresponding monounsaturated linear alkenedioic acids. An example of a suitable monounsaturated linear alkenedioic acid is maleic acid.

Diols

The diols for preferred use may be aromatic or aliphatic compounds. Aliphatic diols are preferred. With particular preference they are linear or cyclic aliphatic diols. These diols may be either saturated or mono- or polyunsaturated. Preferably they are saturated linear or saturated cyclic aliphatic diols.

For example it is possible to use saturated aliphatic diols having 4 to 18, more preferably 6 to 14, and very preferably 6 to 10 carbon atoms. Preferably these are corresponding saturated linear or saturated cyclic aliphatic diols.

Preference is given to using saturated alkanediols or saturated cycloalkanediols. The latter diols may be monocycloalkanediols, bicycloalkanediols, or tricyclo-alkanediols. For example it is possible to use saturated alkanediols having 4 to 18, more preferably 6 to 14, and very preferably 6 to 10 carbon atoms. Preferably these are corresponding saturated linear alkanediols. Suitable saturated alkanediols are, for example, 1,4-butanediol and 1,6-hexanediol.

It is also possible with preference to use saturated cyclic aliphatic diols having 6 to 18, more preferably 6 to 14, and very preferably 6 to 10 carbon atoms.

It is possible with preference to use saturated cycloalkanediols having 6 to 18, more preferably 6 to 14, and very preferably 6 to 10 carbon atoms. Saturated cycloalkanediols for especially preferred use are tricyclodecanediol, cyclohexyldimethanol, and tetramethylcyclobutanediol.

The alpha,omega-hydroxy-functionalized oligoester is prepared using an excess of diols. The molar ratio of dicarboxylic acids to the diols is then, for example, n: (n+1.1) to n: (n+2), preferably n: (n+1.2) to n: (n+1.8), more preferably n: (n+1.3) to n: (n+1.6) and very preferably n: (n+1.3) to n: (n+1.5), where n denotes the amount of substance of the dicarboxylic acid.

The alpha,omega-hydroxy-functionalized oligoester is prepared in a manner familiar to the skilled person. In order to obtain quantitative conversion of the reactants used, the water formed during the reaction must be removed from the chemical equilibrium. This occurs primarily through the use of a water separator.

The alpha,omega-hydroxy-functionalized oligoester, accordingly, is a polycondensation product. The alpha,omega-hydroxy-functionalized oligoester therefore constitutes a mixture of corresponding oligoesters with different chain lengths.

In one preferred embodiment of the alpha,omega-hydroxy-functionalized oligoester for use in accordance with the invention, it is prepared using at least one saturated linear aliphatic dicarboxylic acid, at least one monounsaturated linear aliphatic dicarboxylic acid, and at least one saturated aliphatic diol. The saturated linear aliphatic dicarboxylic acid for use is preferably a linear alkanedioic acid having 4 to 18, more preferably 6 to 14, and very preferably 6 to 10 carbon atoms. The monounsaturated linear dicarboxylic acid is preferably a monounsaturated linear alkenedioic acid having 4 to 10, more preferably 4 to 8, and very preferably 4 to 6 carbon atoms. The saturated aliphatic diol preferably comprises saturated linear alkanediols having 4 to 18, more preferably 6 to 14, and very preferably 6 to 10 carbon atoms, or, likewise preferably, comprises saturated cycloalkanediols having 6 to 18, more preferably 6 to 14, and very preferably 6 to 10 carbon atoms.

Furthermore, of course, it is also possible when preparing the alpha,omega-hydroxy-functionalized oligoester to use triols and monohydroxy-functional compounds. For example, aliphatic triols and also aliphatic monohydroxy-functional compounds may be used. These are preferably corresponding aliphatic hydrocarbon compounds. An example that may be given of a triol is trimethylolpropane. As monohydroxy-functional compounds, for example, dodecanol may be used.

In a further preferred embodiment, the alpha,omega-hydroxy-functionalized oligoester possesses the following structural formula (I):

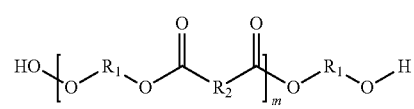

where
the radicals $R_1$ independently of one another are selected from the group of linear or cyclic alkylene radicals,
the radicals $R_2$ independently of one another are selected from the group of alkylene or alkenylene radicals, the ratio of alkylene to alkenylene radicals being selected specifically such that the alpha,omega-hydroxy-functionalized oligoester of the structural formula (I) possesses a theoretical carbon-carbon double bond content of 1 to 2.5 mmol/g,
the index m is selected such that the number-average molecular weight of the alpha,omega-hydroxy-functionalized oligoester of the structural formula (I) is 1000 to 3000 g/mol.

The index m in the structural formula (I) is an integer which is greater than zero.

The requirement that the index m be selected such that the number-average molecular weight of the alpha,omega-hydroxy-functionalized oligoester of the structural formula (I) is 1000 to 3000 g/mol will be explained below. It is assumed that all the radicals $R_1$ are a hexamethylene radical and that half of all the m radicals $R_2$ are each a tetramethylene radical, and the other half are each a radical of the formula —CH=CH—. If, for example, the number-average molecular weight is 1500 g/mol, then m is on average between 6 and 7.

The number-average molecular weight of the alpha,omega-hydroxy-functionalized oligoester of the structural formula (I) is preferably 1000 to 2000 g/mol and more preferably 1200 to 1800 g/mol.

The weight-average molecular weight of the alpha,omega-hydroxy-functionalized oligoester of the structural formula (I) is preferably 3000 to 8000 g/mol and more preferably 3000 to 6000 g/mol.

The alpha,omega-hydroxy-functionalized oligoester of the structural formula (I) possesses an OH number of preferably 40 to 160 mg KOH/g and more preferably 70 to 150 mg KOH/g.

The alpha,omega-hydroxy-functionalized oligoester of the structural formula (I) possesses a theoretical carbon-carbon double bond content of preferably 1.5 to 2 mmol/g and more preferably 1.6 to 1.9 mmol/g.

The alpha,omega-hydroxy-functionalized oligoester of the structural formula (I) possesses an acid number of preferably 0 to 10 mg KOH/g, more preferably 0 to 5 mg KOH/g, and very preferably 0 to 3 mg KOH/g. Theoretically, the acid number of the alpha,omega-hydroxy-functionalized oligoester of the structural formula (I) is 0 mg KOH/g. If said oligoester is prepared from corresponding diols and also corresponding dicarboxylic acids and/or their anhydrides, then it is possible in principle for carboxylic acid groups to be present which have not reacted with a corresponding diol. In such a case, the resulting product mixture would have an acid number of >0 mg KOH/g. In accordance with the ranges stated above for the acid number, it is preferred for the resulting reaction mixture to possess as few carboxylic acid groups as possible.

Independently of one another, the radicals $R_1$ are selected from the group of linear or cyclic alkylene radicals. If there is more than one kind of radicals $R_1$ present in the alpha,omega-hydroxy-functionalized oligoester of the structural formula (I), their arrangement is statistical. In the case of a linear alkylene radical, it contains preferably 4 to 18, more preferably 6 to 14, and very preferably 6 to 10 carbon atoms. With very particular preference this is a hexamethylene radical. In the case of a cyclic alkylene radical, it contains preferably 6 to 18, more preferably 6 to 14, and very preferably 6 to 10 carbon atoms. With very particular preference this is a tricyclodecane radical.

Independently of one another, the radicals $R_2$ are selected from the group of alkylene or alkenylene radicals, the ratio of alkylene to alkenylene radicals being specifically selected such that the alpha,omega-hydroxy-functionalized oligoester of the structural formula (I) possesses a theoretical carbon-carbon double bond content of 1 to 2.5 mmol/g, preferably of 1.5 to 2 mmol/g, and very preferably of 1.6 to 1.9 mmol/g. The arrangement of the different kinds of radicals $R_2$ in the alpha,omega-hydroxy-functionalized oligoester of the structural formula (I) is statistical.

$R_2$ is preferably either a linear alkylene radical or a linear alkenylene radical. It is likewise preferred for the molar ratio between the alkylene and alkenylene radicals to be 0.5:1.5 to 1.5:0.5, particularly preferably 0.75:1.25 to 1.25:0.75, and very preferably 0.9:1.1 to 1.1:0.9.

If $R_2$ is a linear alkylene radical, it contains preferably 2 to 16, more preferably 4 to 12, and very preferably 4 to 8 carbon atoms. It is, for example, a tetramethylene radical.

$R_2$ may, furthermore, be a linear alkenylene radical. This radical is preferably a monounsaturated linear alkenylene radical which contains preferably 2 to 8, more preferably 2 to 6, and very preferably 2 to 4 carbon atoms. With very particular preference it is an alkenylene radical of the structure —CH═CH—.

Description of the Alkoxysilane of the Structural Formula (II)

An aliphatic radical R is an organic radical which possesses no aromatic groups such as a phenyl radical, for example. The aliphatic radical R may have 2 to 12 carbon atoms. A cycloaliphatic radical R is an organic radical which possesses no aromatic groups such as a phenyl radical, for example. The cycloaliphatic radical R may have 3 to 12 carbon atoms, as in the case of cyclopropyl or cyclohexyl, for example. An aromatic radical R is an organic radical which is constructed from aromatic groups, such as a phenylene radical, for example. The aromatic radical R may have 6 to 12 carbon atoms. An araliphatic radical R is an organic radical which has not only aromatic groups but also aliphatic groups. The araliphatic radical R may have 7 to 18 carbon atoms. A radical R as an aliphatic radical R may, in addition to carbon and hydrogen, also contain heteroatoms, such as oxygen, nitrogen, or sulfur. In addition there may in each case likewise be further functional groups present, such as ester groups or urethane groups. Furthermore, the radical R may likewise contain alkene or alkyne groups. It may likewise be polyunsaturated and/or may likewise contain more than one alkyne group. R is more preferably an aliphatic radical having 2 to 12 carbon atoms or having 2 to 10 carbon atoms, very preferably 2 to 8 carbon atoms, and especially 2 to 6 carbon atoms. To the skilled person it is clear that the radical R is a divalent radical.

The radical R' is preferably a $C_2$ to $C_{10}$ alkylene radical, more preferably a $C_2$ to $C_8$ alkylene radical, and very preferably a $C_3$ to $C_6$ alkylene radical.

The OH-reactive functional group A is preferably an isocyanate group or an epoxide group. More preferably it is an isocyanate group.

Preference is given to using alkoxysilanes of the general structural formula (II.1)

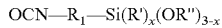

where
$R_1$ is a $C_2$ to $C_{12}$ alkylene radical, a $C_2$ to $C_{12}$ alkenylene radical, or a polyunsaturated $C_4$ to $C_{12}$ alkylene radical,
the radical R' is selected from the group of $C_1$ to $C_{12}$ alkyl radicals,
R" is a methyl or ethyl radical, and
x is 0 to 2.

Preferably $R_1$ is a $C_2$ to $C_{12}$ alkylene radical or even a $C_2$ to $C_{10}$ alkylene radical. More preferably it is a $C_2$ to $C_8$ alkylene radical and very preferably a $C_2$ to $C_6$ alkylene radical or a $C_3$ alkylene radical. Concerning the radical R', reference may be made to the preferred, more preferred, and very preferred features specified above. Furthermore, x is preferably 0 or 1, and very preferably x=0.

Preference is likewise given to using alkoxysilanes of the general structural formula (II.2)

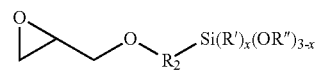

where
$R_2$ is a $C_2$ to $C_{10}$ alkylene radical, a $C_2$ to $C_{10}$ alkenylene radical, or a polyunsaturated $C_4$ to $C_{10}$ alkylene radical,
the radical R' is selected from the group of $C_1$ to $C_{12}$ alkyl radicals,
R" is a methyl or ethyl radical, and
x is 0 to 2.

Preferably $R_2$ is a $C_2$ to $C_{10}$ alkylene radical or even a $C_2$ to $C_0$ alkylene radical. More preferably it is a $C_2$ to $C_6$ alkylene radical and very preferably a $C_2$ to $C_4$ alkylene radical or a $C_3$ alkylene radical. Concerning the radical R', reference may be made to the preferred, more preferred, and very preferred features specified above. Furthermore, x is preferably 0 or 1, and very preferably x=0.

Preference is likewise given to using alkoxysilanes of the general structural formula (II.3)

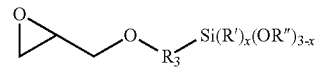

where
R$_3$ is a C$_2$ to C$_{12}$ alkylene radical, a C$_2$ to C$_{12}$ alkenylene radical, or a polyunsaturated C$_4$ to C$_{12}$ alkylene radical,
the radical R' is selected from the group of C$_1$ to C$_{12}$ alkyl radicals,
R" is a methyl or ethyl radical, and
x is 0 to 2.

Preferably R$_3$ is a C$_2$ to C$_{12}$ alkylene radical or even a C$_2$ to C$_{10}$ alkylene radical. More preferably it is a C$_2$-bis C$_8$ alkylene radical and very preferably a C$_2$ to C$_6$ alkylene radical or a C$_3$ alkylene radical. Concerning the radical R', reference may be made to the preferred, more preferred, and very preferred features specified above. Furthermore, x is preferably 0 or 1, and very preferably x=0.

Preparation of the Additive of the Invention

The additive of the invention is prepared by, for example, reaction of at least one alpha,omega-hydroxy-functionalized oligoester with at least one alkoxysilane of the structural formula (II). The reaction is carried out in organic solvents. Suitable solvents are all solvents known to the skilled person that do not have an active H atom. Examples of suitable solvents are esters such as butyl acetate or naphtha. The reaction may optionally be carried out in the presence of at least one water scavenger such as triethyl orthoformate, for example. Preference is given to first introducing the alkoxysilane of the structural formula (II) and then adding the alpha,omega-hydroxy-functionalized oligoester dropwise. Where A is an isocyanate group, the amount of remaining isocyanate groups in the reaction solution can be determined by titrimetry, in accordance for example with DIN EN ISO 11909 (date: May 2007). Where A is an epoxide group, the amount of remaining epoxide groups in the reaction solution can be determined by titrimetry, in accordance for example with DIN EN ISO 3001 (date: November 1999).

In one particularly preferred embodiment of the additive of the invention, it is prepared by the reaction of at least one alpha,omega-hydroxy-functionalized oligoester of the structural formula (I) with at least one alkoxysilane of the structural formula (II.1).

Further particularly preferred embodiments of the additive of the invention are identified hereinafter:

a) In one particularly preferred embodiment of the additive of the invention, the alpha,omega-hydroxy-functionalized oligoester of the structural formula (I) possesses a number-average molecular weight of 1200 to 1800 g/mol.
b) In another particularly preferred embodiment of the additive of the invention, the alpha,omega-hydroxy-functionalized oligoester of the structural formula (I) possesses a weight-average molecular weight of 3000 to 6000 g/mol.
c) In a further particularly preferred embodiment of the additive of the invention, the alpha,omega-hydroxy-functionalized oligoester of the structural formula (I) possesses an OH number of 70 to 150 mg KOH/g.
d) In a further particularly preferred embodiment of the additive of the invention, the alpha,omega-hydroxy-functionalized oligoester of the structural formula (I) possesses a theoretical carbon-carbon double bond content of 1.5 to 2 mmol/g.
e) In a further particularly preferred embodiment of the additive of the invention, the radicals R$_1$ in the alpha,omega-hydroxy-functionalized oligoester of the structural formula (I) are selected from the group of linear alkylene radicals having 6 to 10 carbon atoms.
f) In a further particularly preferred embodiment of the additive of the invention, the radicals R$_2$ in the alpha,omega-hydroxy-functionalized oligoester of the structural formula (I) are selected from the group of linear alkylene radicals having 4 to 8 carbon atoms or of linear alkenylene radicals having 2 to 4 carbon atoms.
g) In a further particularly preferred embodiment of the additive of the invention or of the alpha,omega-hydroxy-functionalized oligoester of the structural formula (I), the molar ratio between the linear alkylene radicals and the linear alkenylene radicals is 0.9:1.1 to 1.1:0.9.
h) In a further particularly preferred embodiment of the additive of the invention, the radical R$_1$ in the alkoxysilane of the structural formula (II.1) is a C$_2$ to C$_6$ alkylene radical.
i) In a further particularly preferred embodiment of the additive of the invention, x in the alkoxysilane of the structural formula (II.1) is zero.
j) In a further particularly preferred embodiment of the additive of the invention, at least 99 mol % of all the OH groups of the alpha,omega-hydroxy-functionalized oligoester are reacted with an OH-reactive functional group A of the alkoxysilane of the invention.

In an especially preferred embodiment of the alpha,omega-hydroxy-functionalized oligoester of the invention, all of the features indicated under a) to j) are realized in combination.

Description of the Solventborne Primer Surfacer

It is essential to the invention that the solventborne primer surfacer comprises at least one additive of the invention. The sum of the weight percentage fractions of all the additives of the invention is 0.5 to 10 wt %, based on the total amount of the solventborne primer surfacer. The sum of the weight percentage fractions of all of the additives of the invention is preferably 1 to 9 wt %, more preferably 1 to 8 wt %, and very preferably 1.5 to 7.5 wt % or even 1.5 to 6.5 wt %, based in each case on the total weight of the primer surfacer.

Below the lower limit of 0.5 wt %, there is no improvement in the adhesion. Above the upper limit of 10 wt %, disadvantages occur, such as yellowing of the resultant coating, for example.

In the solventborne primer surfacer of the invention, the sum of the weight percentage fractions of the additives of the invention is 0.5 to 10 wt %, based on the total amount of the solventborne primer surfacer. Where preferred embodiments of the additives of the invention are used, the sum of the weight percentage fractions of all preferred embodiments of the additive is preferably likewise 0.5 to 10 wt %, based on the total amount of the solventborne primer surfacer. With particular preference, the primer surfacer of the invention, as corresponding additives, comprises exclusively preferred embodiments of the additives.

In one preferred embodiment of the solventborne primer surfacer of the invention, the sum of the weight percentage fractions of the additives of the invention is 1 to 9 wt %, based on the total amount of the solventborne primer surfacer. Where preferred embodiments of the additives of the invention are used, the sum of the weight percentage fractions of all preferred embodiments of the additive is preferably likewise 1 to 9 wt %, based on the total amount of the solventborne primer surfacer. With particular preference, the primer surfacer of the invention, as corresponding additives, comprises exclusively preferred embodiments of the additives.

In one particularly preferred embodiment of the solventborne primer surfacer of the invention, the sum of the weight percentage fractions of the additives of the invention is 1 to 8 wt %, based on the total amount of the solventborne primer surfacer. Where preferred embodiments of the additives of the invention are used, the sum of the weight percentage fractions of all preferred embodiments of the additive is preferably likewise 1 to 8 wt %, based on the total amount of the solventborne primer surfacer. With particular preference, the primer surfacer of the invention, as corresponding additives, comprises exclusively preferred embodiments of the additives.

In one especially preferred embodiment of the solventborne primer surfacer of the invention, the sum of the weight percentage fractions of the additives of the invention is 1.5 to 7.5 wt %, based on the total amount of the solventborne primer surfacer. Where preferred embodiments of the additives of the invention are used, the sum of the weight percentage fractions of all preferred embodiments of the additive is preferably likewise 1.5 to 7.5 wt %, based on the total amount of the solventborne primer surfacer. With particular preference, the primer surfacer of the invention, as corresponding additives, comprises exclusively preferred embodiments of the additives.

In a likewise especially preferred embodiment of the solventborne primer surfacer of the invention, the sum of the weight percentage fractions of the additives of the invention is 1.5 to 6.5 wt %, based on the total amount of the solventborne primer surfacer. Where preferred embodiments of the additives of the invention are used, the sum of the weight percentage fractions of all preferred embodiments of the additive is preferably likewise 1.5 to 6.5 wt %, based on the total amount of the solventborne primer surfacer. With particular preference, the primer surfacer of the invention, as corresponding additives, comprises exclusively preferred embodiments of the additives.

Examples of embodiments of the additive of the invention that are preferred in this sense are those already specified in connection with the description of the additive of the invention.

The solids content of the primer surfacer may be determined by weighing out approximately 2 g of sample into an aluminum dish dried beforehand and carrying out drying in a drying oven at 125° C. for 60 minutes, followed by cooling in a desiccator, and then by re-weighing. The residue, relative to the total amount of the sample employed, corresponds to the solids fraction. The solids content was determined in accordance with DIN EN ISO 3251 (date: June 2008) (1-2 g over the duration of 1 h at 125° C.)

The solventborne primer surfacers familiar to the skilled person may be used. The primer surfacer comprises at least one organic polymer as binder. These organic polymers are, for example, the polyester and/or polyacrylate and polymethacrylate resins (referred to hereinafter as poly (meth)acrylate resins) known to the skilled person. The stated organic polymers preferably further comprise different functional groups for chemical crosslinking, with hydroxyl groups being preferred. With preference, polyester resins and/or poly(meth)acrylate resins, preferably containing hydroxyl groups, are used as binders. Organic polymers and resins of these kinds are described in, for example, Rompp-Lexikon Lacke und Druckfarben, Georg Thieme Verlag, Stuttgart, N.Y., 1998, pages 73 to 74. Polyesters produce particularly flexible primer surfacers. Poly(meth) acrylate resins are preferred on account of their more rapid physical drying and the fact that they ultimately allow earlier processing. In addition it is also possible to use epoxy resins as well. These resins are described, for example, in Römpp-Lexikon Lacke und Druckfarben, Georg Thieme Verlag, Stuttgart, N.Y., 1998, pages 196 to 197. One epoxy resin for preferred use in this context is Epikote 1001. As crosslinkers, polyisocyanate adducts may be used. Polyisocyanate adducts used, on account of their low viscosity and better weather resistance, are aliphatic and also cycloaliphatic polyisocyanate adducts. These are products which are also employed in the two-component clearcoat materials of automotive OEM finishing. The polyisocyanate adducts used are customarily oligomers of diisocyanates. The basis of the polyisocyanate adducts is formed by, for example, hexamethylene diisocyanate (HMDI), isophorone diisocyanate (IPDI), diphenylmethane diisocyanate (MDI) and tetramethylxylyl diisocyanate (TMXDI). In addition, however, it is also possible to use all common diisocyanates known to the skilled person. The processes for the oligomerization lie in the formation of different adducts: urethanes, allophanates, biurets, uretdiones, and—preferably—isocyanurates. Employed with particular preference on account of their viscosity are isocyanurate trimers of hexamethylene diisocyanate.

The fraction of all the film-forming components, especially of the hydroxy-functional polyester resin and/or poly (meth)acrylate resin and of the polyisocyanate adduct as crosslinker, is advantageously in the range from 10 to 90 wt %, preferably from 15 to 60 wt %, more preferably in the range from 20 to 50 wt %, based in each case on the total amount of the solventborne primer surfacer. The fraction of any separately considered resin as binder, and also of a crosslinker, is advantageously not below 3 wt %, based on the total amount of the solventborne primer surfacer.

Customarily it is necessary to catalyze the crosslinking reaction. For this purpose, organotin salts are almost always used. For the purposes of the present invention, preference is given to using dibutyltin dilaurate, since its relatively long-chain acid radical endows it with particularly high compatibility with the binder and then, later on, with the film matrix.

The pigmentation of the primer surfacers consists customarily of titanium dioxide and/or iron oxide pigment and carbon black. In addition, suitable fillers are present. Fillers which can be used are the customary fillers employable in the coatings industry. Fillers are described in, for example, Rompp-Lexikon Lacke and Druckfarben, Georg Thieme Verlag, Stuttgart, N.Y., 1998, pages 250 to 252. In addition, corrosion inhibitors are customarily used, such as silicates, orthophosphates, and polyphosphates, for example. Only for special cases are pigmented primer surfacers prepared, which support the color planned for the topcoat finish. The primer surfacers normally have various gray shades, produced by fractions of pigment-grade carbon blacks and iron oxides (mostly yellow iron oxide).

The primer surfacer of the invention further comprises organic solvents. Examples of those that may be present include aliphatic and/or aromatic hydrocarbons such as toluene, xylene, solvent naphtha, Solvesso 100, Shellsol A, ketones, such as acetone, methyl ethyl ketone, or methyl amyl ketone, esters, such as ethyl acetate, butyl acetate, methoxypropyl acetate, butyl glycol acetate, pentyl acetate, or ethyl ethoxypropionate, ethers such as butyl glycol and dipropylene glycol methyl ether, alcohols such as ethylhexanol, butoxypropanol, isopropanol, or butyl diglycol, or mixtures of the aforementioned solvents.

Furthermore, the primer surfacer is solventborne. The term "solventborne" is to be understood below to mean that exclusively organic solvents, and no water, are used as solvent. More particularly, the water content of the solventborne primer surfacer of the invention is to be not greater than 5 wt %, and especially not greater than 2 wt %, based in each case on the total amount of the solventborne primer surfacer of the invention.

The primer surfacer may further comprise at least one conventional coatings additive. Such coatings additives are for example—but not exclusively—
- defoamers,
- polymerization inhibitors,
- slip additives,
- wetting agents such as siloxanes, fluorine-containing compounds, carboxylic monoesters,
- flow control agents,
- rheology control additives,
- dispersants,
- corrosion inhibitors,
- and/or flame retardants.

Description of the Process of the Invention

The present invention further relates to a process for producing a multicoat paint system on a substrate, comprising
(A) applying the primer surfacer of the invention,
(B) applying a further coating material.

All of the particular features already discussed above with regard to the solventborne primer surfacer of the invention are likewise preferred for the process of the invention that is in question.

In one preferred embodiment of the process of the invention
i. the primer surfacer film obtained in step (A) is dried,
ii. the coating material in step (B) is a topcoat material, and
iii. the dried primer surfacer film and the topcoat film obtained in step (B) are jointly cured.

The present invention likewise relates to a multicoat paint system which is producible according to this preferred embodiment of the process of the invention. All of the particular features discussed with regard to the solventborne primer surfacer of the invention and also to this preferred embodiment of the process of the invention are likewise preferred for the multicoat paint system.

Drying in the sense of section i. refers to the giving-off of solvents. The conditions under which this may take place are described later on below in the text, for each of the films/coats. By curing in the sense of section iii. is meant thermal curing. For the purposes of the present invention, the term "thermal curing" denotes the heat-initiated crosslinking of a coating film, with either a separate crosslinking agent or else self-crosslinking binders being employed in the parent coating material. The crosslinking agent comprises reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. The conditions under which the thermal curing may take place are described later on below in the text, for each of the films/coats.

This process is used preferably for the finishing of utility vehicles. Suitable substrates are therefore metal substrates in particular. Metal substrates are all of those familiar to the skilled person, such as aluminum, iron, zinc, and magnesium, for example, and also alloys thereof. Particularly preferred are substrates of aluminum or steel.

Depending on material, the metal substrates may also be provided with an electrodeposition coating, as in the case of steel, for example. If alternatively an aluminum substrate is used, it is preferably not provided with an electrodeposition coating, but is instead abraded before the primer surfacer is applied. Besides metallic substrates, it is also possible to coat all of the customary thermoplastic or thermoset polymer substrates that are known to the skilled person.

Topcoat

The solventborne topcoat materials familiar to the skilled person may be used. The topcoat material comprises at least one organic polymer as binder. These organic polymers are, for example, the polyester resins and/or polyacrylate and polymethacrylate resins (referred to hereinafter as poly(meth)acrylate resins) that are known to the skilled person. The stated organic polymers as binders preferably further comprise different functional groups for chemical crosslinking, with hydroxyl groups being preferred. Poly(meth)acrylate resins are used with preference, on account of their much better initial drying rate as compared with polyesters. Particular preference is given to using poly(meth)acrylate resins which have been modified with glycidyl esters of branched saturated fatty acids. This raises their capacity to accommodate pigment. Crosslinkers used are aliphatic polyisocyanate adducts of low viscosity, which have already been discussed in connection with the description of the solventborne primer surfacer of the invention. Here likewise, very particular preference is given to using isocyanurate trimers of hexamethylene diisocyanate.

Customarily it is necessary to catalyze the crosslinking reaction. Organotin salts are used with preference for this purpose. For the purposes of the present invention, particular preference is given to using dibutyltin dilaurate (DBTL), since its relatively long-chain acid radical endows it with particularly high compatibility with the binder and then later on with the film matrix.

The topcoat material further comprises at least one customary and known, color-imparting and/or effect-imparting pigment. Pigments which may be selected are in principle those which the skilled person also uses for automotive OEM finishing.

Examples of such pigments are inorganically based pigments, such as titanium dioxide, iron oxide, and carbon black, for example, or else customary metal pigments (examples being commercial aluminum bronzes, stainless steel bronzes) and nonmetallic effect pigments (examples being pearlescent pigments and interference pigments). Color-imparting pigments on an organic basis as well, such as azopigments and phthalocyanine pigments, may be employed.

Solvents which can be used are all those which have already been specified above in connection with the solventborne primer surfacer of the invention.

Application of the Primer Surfacer and Topcoat

Prior to the application of the primer surfacer there are customarily one curing component, one primer surfacer component, and one diluent component present. Here, the curing component comprises the crosslinking agent, the primer surfacer component comprises the binder and also corresponding pigments and fillers, and the diluent component comprises corresponding solvents. The additive of the invention may be either in the primer surfacer component or in the diluent. Shortly before application, these three components are mixed with one another in a ratio familiar to the skilled person, and the resulting primer surfacer is applied. It is possible in principle to use any customary methods of application, such as spraying, knife coating, brushing, pouring, dipping, impregnating, trickling, or rolling, for example.

Spray application is preferred. In the course of such application, the substrate to be coated may itself be at rest, with the application device or system being in motion. Preference is given to employing spray application methods, such as compressed air spraying (pneumatic application), airless spraying, high-speed rotation, electrostatic spray application (ESTA), alone or in conjunction with hot spray application such as hot air spraying, for example.

The solventborne primer surfacer of the invention is applied in the customary and known film thicknesses, such as in wet film thicknesses of 70 to 170 micrometers, for example, preferably of 90 to 150 micrometers. The resulting dry film thicknesses after curing are then, for example, in the range from 50 to 80 micrometers, preferably in the range from 60 to 70 micrometers.

A topcoat film is applied over the applied primer surfacer film. The primer surfacer film is preferably dried before the topcoat is applied. This may be done, for example, at room temperature (18 to 23° C.) for 5 to 90 minutes, preferably 20 to 80 minutes, and very preferably 30 to 70 minutes.

The general methods of application for the topcoat correspond to those as described earlier on above for the solventborne primer surfacer of the invention.

The topcoat material is applied in the customary and known film thicknesses, such as in wet film thicknesses of 50 to 200 micrometers, for example, preferably of 60 to 150 micrometers. The resulting dry film thicknesses after curing are then, for example, in the range from 30 to 90 micrometers, preferably in the range from 40 to 70 micrometers.

The curing of primer surfacer and topcoat takes place jointly. This joint curing has no peculiarities in terms of method, but instead takes place in accordance with the customary and known methods such as heating in a forced air oven, for example. Accordingly, curing may take place, for example, in the range of room temperature (18 to 23° C.) or else at elevated temperatures in the range of, for example 40° C. to 100° C., preferably of 50° C. to 90° C. Curing may take place, for example, over a time of 5 to 120 minutes, preferably 10 to 40 minutes. Curing may optionally also be preceded by a flashing-off or preliminary-drying phase, at room temperature for a period of 1 to 60 minutes, for example.

The multicoat paint systems produced using the solventborne primer surfacer of the invention feature excellent adhesion between primer surfacer coat and topcoat, and also between primer surfacer and substrate. There is likewise an improvement in adhesion if the coated substrate has been exposed, for example, to weathering. An improvement in adhesion refers to the improvement relative to a primer surfacer containing no additive of the invention.

The primer surfacers of the invention are suitable in particular for application in the finishing of utility vehicles.

In a likewise preferred embodiment of the process of the invention
  i. a primer is applied to the substrate before the application of the primer surfacer in step (A), and the resulting primer film is dried,
  ii. the dried primer film and the primer surfacer film obtained in step (A) are jointly cured,
  iii. the further coating material in step (B) is a basecoat material, and is applied to the cured primer surfacer film and subsequently dried, and
  iv. a clearcoat material is applied to the dried basecoat film, and the dried basecoat film and the resulting clearcoat film are jointly cured.

What is meant by the terms "drying" and "curing" has already been explained above.

The present invention likewise relates to a multicoat paint system producible according to this preferred embodiment of the process of the invention. All particular features discussed with regard to the solventborne primer surfacer of the invention and also to this preferred embodiment of the process of the invention are likewise preferred for the multicoat paint system.

The substrates that can be used are the same as those already described above. Particular preference is likewise given to substrates of aluminum or steel.

The substrates may be used in untreated form. They may alternatively be abraded beforehand. Particularly in automotive refinish, the substrate may be freed from the old, damaged finish by sanding. Frequently, however, the old finish is only partly sanded, without being fully removed.

Primer

The primers used consist customarily of two-component materials which comprise low-viscosity epoxy resins and polyamine adducts as crosslinkers. Primary and secondary amines react even at room temperature with epoxide groups, producing secondary and tertiary amines, respectively.

Aromatic epoxy resins are typically employed. They are prepared preferably from bisphenol A and epichlorohydrin. A corresponding epoxy resin from the reaction of one equivalent of bisphenol A with two equivalents of epichlorohydrin is preferably prepared. The use of aromatic epoxy resins of higher molecular mass is additionally preferred. These resins are prepared customarily by reaction of bisphenol A diglycidyl ether with different amounts of bisphenol A.

Amines used may be ethylenediamine, propylenediamine, diethylenetriamine, dipropylenetriamine, isophorone-diamine, and bis-(4-amino-3-methylcyclohexyl)methane. From polyamines, furthermore, it is also possible to generate oligomeric products which still contain a sufficient number of free amino groups for crosslinking. Such amine adducts consist customarily of an epoxy resin, which is reacted with an excess of polyamines; for example, an adduct of two equivalents of diethylenetriamine and one equivalent of bisphenol A diglycidyl ether. Another group of crosslinkers are low molecular mass polyamides having free, terminal and pendant, primary or secondary amino groups. The polyamides are prepared by reaction of an excess of the above-recited amines with polymeric fatty acids.

Suitable solvents are esters, alcohols, and aromatic compounds. The primers used are preferably chromate-free. Anticorrosion pigments they comprise are preferably zinc phosphates. In addition they comprise titanium dioxide and fillers. The primers used may be pigmented, moreover, with carbon black and/or iron oxides.

Basecoat Materials

Not only solventborne but also aqueous basecoat materials may be employed.

The solventborne basecoat materials comprise preferably cellulose acetobutyrate and also polyester resins and/or polyacrylate and polymethacrylate resins (referred to hereinafter as poly(meth)acrylate resins). The polyester resins and/or poly(meth)acrylate resins preferably further comprise different functional groups for chemical crosslinking, with hydroxyl groups being preferred.

Crosslinkers used are aliphatic polyisocyanate adducts of low viscosity, which have already been discussed in connection with the description of the solventborne primer surfacer of the invention. Here likewise, very particular preference is given to using isocyanurate trimers of hexamethylene diisocyanate.

Solvents which can be used are all those already specified above in connection with the solventborne primer surfacer of the invention.

The use of aqueous basecoat materials is preferred. "Aqueous" is a term, familiar to the skilled person, applied specifically to coating materials which as solvents do not exclusively comprise organic solvents, but instead are also based on water as solvent. "Aqueous" in the context of the present invention means in particular that the basecoat material comprises preferably at least 20 wt %, more preferably at least 25 wt %, of water, based in each case on the total amount of the aqueous basecoat material. With particular preference, "aqueous" should be understood to mean that in addition to the stated conditions "at least 20 wt % (or at least 25 wt %) of water, based on the total amount of the aqueous basecoat material", the further precondition is met that the fraction of organic solvents in the basecoat material is less than 10 wt %, based in each case on the total amount of the aqueous basecoat material.

Besides water, moreover, the aqueous basecoat material may also comprise organic solvents. Water-miscible organic solvents are used with preference.

Serving as binders in aqueous basecoat materials are preferably polyurethane resins, polyester resins and/or epoxy resins. Likewise possible is the use of poly(meth)acrylate resins. The stated organic polymers preferably further comprise different functional groups for chemical crosslinking, with hydroxyl groups being preferred. Dispersibility of the organic polymers in water can be achieved via measures familiar to the skilled person. These may involve the ionic modification of the organic polymers through introduction of monomers containing, for example, carboxylate groups or sulfonate groups. Crosslinkers used are preferably polyisocyanates. Preferred polyisocyanates are all those already disclosed in describing the solventborne primer surfacer.

In addition, both a solventborne basecoat material and an aqueous basecoat material comprise at least one customary and known, color-imparting and/or effect-imparting pigment. Examples of such pigments are inorganically based pigments, such as titanium dioxide, iron oxide, and carbon black, for example, or else customary metal pigments (examples being commercial aluminum bronzes, stainless steel bronzes) and nonmetallic effect pigments (examples being pearlescent pigments and interference pigments). Color-imparting pigments on an organic basis as well, such as azopigments and phthalocyanine pigments, may be employed. The selection of pigment type and amount of pigments to be used is made in the manner familiar to the skilled person, and is guided by the required or desired properties of the coating material. For further details of this, refer to Römpp-Lexikon Lacke and Druckfarben, Georg Thieme Verlag, Stuttgart, N.Y., 1998, page 451.

Clearcoat Material

A clearcoat, as is known, is a coating material which after application and curing, forms a transparent coating (the clearcoat) having protective and/or decorative properties. Protective properties are, for example, scratch resistance and weathering resistance, especially UV resistance. A decorative property is, for example, good gloss. The clearcoat materials for use are the clearcoat materials customarily used in the field of refinishing, whose selection and use is known to the skilled person. A clearcoat material of this kind customarily comprises OH-functional poly(meth)acrylate resins. As crosslinkers, low-viscosity aliphatic polyisocyanate adducts are used. In this context it is possible to use the same polyisocyanates already used when describing the primer surfacer of the invention.

Application of the Primer, Primer Surfacer, Basecoat, and Clearcoat Materials

The primer is applied according to the customary application methods, such as spraying, knife coating, brushing, pouring, dipping, impregnating, trickling, or rolling, for example. Spray application is preferred.

The primer is applied in the customary and known film thicknesses, as for example in wet film thicknesses of 20 to 70 micrometers, preferably of 30 to 50 micrometers. The resulting dry film thicknesses after curing are then, for example, in the range from 10 to 30 micrometers, preferably in the range from 15 to 20 micrometers. Prior to the application of the primer surfacer of the invention, the primer film is dried. This may take place, for example, at room temperature (18 to 23° C.) for 5 to 90 minutes, preferably 20 to 80 minutes, and very preferably 30 to 70 minutes.

Prior to the application of the primer surfacer there is customarily one curing component, one primer surfacer component, and one diluent component present. In this case, the curing component comprises the crosslinking agent, the primer surfacer component comprises the binder and also corresponding pigments and fillers, and the diluent component comprises corresponding solvents. The additive of the invention may be either in the primer surfacer component or in the diluent. Shortly before application, these three components are mixed with one another in a ratio familiar to the skilled person, and the resulting primer surfacer is applied. It is possible in principle to use all of the above-stated application methods already specified in connection with the primer. Spray application is preferred. The solventborne primer surfacer of the invention is applied in the customary and known film thicknesses, as for example in wet film thicknesses of 70 to 160 micrometers, preferably of 80 to 140 micrometers. The resulting dry film thicknesses after curing are then, for example, in the range from 40 to 80 micrometers, preferably in the range from 50 to 70 micrometers.

The primer film and the primer surfacer film are subsequently cured jointly. Curing has no peculiarities in terms of method, but instead takes place according to the customary and known methods such as heating in a forced air oven, for example. Curing accordingly may take place for example in the region of room temperature (18 to 23° C.) or else at elevated temperatures in the range of, for example, 40° C. to 100° C., preferably of 50° C. to 90° C. Curing may take place, for example, over a time of 5 to 120 minutes, preferably 10 to 40 minutes. Curing may optionally also be preceded by a flashing-off or preliminary-drying phase, at room temperature for a period of 1 to 60 minutes, for example.

This is followed by application of a basecoat material. The general methods of applying the basecoat material have no peculiarities in terms of method and correspond to those as described earlier on above for the primer and for the solventborne primer surfacer.

The basecoat material is applied in the customary and known film thicknesses, such as in wet film thicknesses in the range from 20 to 100 micrometers, for example, preferably in the range from 30 to 60 micrometers. The resulting dry film thicknesses after curing are then, for example, in the range from 10 to 40 micrometers, preferably in the range from 14 to 20 micrometers.

The basecoat film is dried before the clearcoat material is applied. This drying may be done, for example, at room temperature (18 to 23° C.) for 5 to 60 minutes, preferably 5 to 40 minutes, and very preferably 10 to 30 minutes.

This is followed by application of the clearcoat material. The general methods of applying the clearcoat material have no peculiarities in terms of method and correspond to those as described earlier on above for the primer and for the solventborne primer surfacer. Spray application is particularly preferred.

The clearcoat material is applied in the customary and known film thicknesses, such as in wet film thicknesses in the range from 50 to 200 micrometers, for example, preferably in the range from 60 to 150 micrometers. The resulting dry film thicknesses after curing are then, for example, in the range from 25 to 90 micrometers, preferably in the range from 35 to 70 micrometers.

The basecoat film and the clearcoat film are subsequently cured jointly. Curing has no peculiarities in terms of method, but instead takes place according to the customary and known methods such as heating in a forced air oven, for example. Curing accordingly may take place for example in the region of room temperature (18 to 23° C.) or else at elevated temperatures in the range of, for example, 40° C. to 100° C., preferably of 50° C. to 90° C. Curing may take place, for example, over a time of 5 to 120 minutes, preferably 10 to 40 minutes. Curing may optionally also be preceded by a flashing-off or preliminary-drying phase, at room temperature for a period of 1 to 60 minutes, for example.

The multicoat paint systems produced using the solventborne primer surfacer of the invention feature excellent adhesion between primer surfacer coat and primer coat, and also between primer surfacer and basecoat. There is likewise an improvement in adhesion if the coated substrate has been exposed, for example, to weathering. An improvement in adhesion refers to the improvement relative to a primer surfacer containing no additive of the invention.

The primer surfacers of the invention are suitable in particular for application in refinishing of automobiles.

Use of the Additive of the Invention as Adhesion Promoter

The present invention also relates, lastly, to the use of at least one additive in solventborne primer surfacers, where the additive is preparable by reacting (a) at least one alpha,omega-hydroxy-functionalized oligoester which possesses an OH number of 30 to 160 mg KOH/g, a theoretical carbon-carbon double bond content of 1 to 2.5 mmol/g, a number-average molecular weight of 1000 to 3000 g/mol, and a weight-average molecular weight of 2800 to 10 000 g/mol, and (b) at least one alkoxysilane of the structural formula (II)

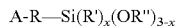

A-R—Si(R')$_x$(OR'')$_{3-x}$ where

A is an OH-reactive functional group,

R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms, the radical R' is selected from the group of $C_1$ to $C_{12}$ alkyl radicals, R'' is a methyl or ethyl radical, and x is 0 to 2, with the proviso that at least 90 mol % of all the OH groups of the alpha,omega-hydroxy-functionalized oligoester have been reacted with an OH-reactive functional group A, and, moreover, the sum of the weight percentage fractions of all additives of the invention is 0.5 to 10 wt %, based on the total amount of the solventborne primer surfacer.

All particular features already discussed above with regard to the solventborne primer surfacer of the invention are likewise preferred for the inventive use that is in question.

Improvement in adhesion refers to an improvement in the adhesion by comparison with primer surfacers which do not include an additive of the invention.

The adhesion can be investigated with the aid, for example, of the cross-cut test according to DIN EN ISO 2409 (date: April 2010). The additives of the invention also contribute to an improvement in the adhesion after the substrate has been subjected to weathering. Such weathering may be simulated, for example, by the constant conditions test according to DIN EN ISO 6270-2 CH (date: September 2005). The additives of the invention are used with preference for improving the adhesion in the context of the finishing of utility vehicles. The adhesion here is improved not only between substrate and primer surfacer, but also between primer surfacer and topcoat.

The additives of the invention are likewise used with preference for improving adhesion in the context of automotive refinish. The term "automotive refinish" refers among other things to the refinishing which takes place, for example, in a workshop for the purpose of repairing damaged existing paint finishes. Defects in coatings may in principle also occur directly after OEM finishing has taken place. In that case, the term used is OEM refinishing. The primer surfacers of the invention may likewise be employed in OEM refinishing. In both cases, the primer surfacers of the invention are also suitable for the repair of small defects, referred to as "spots". An operation of this kind is also termed "spot repair".

EXAMPLES

Preparation Examples

Example A: Preparation of an Alpha,Omega-Hydroxy-Functionalized Oligoester

The reactants identified in table 1 are reacted as set out below in the molar proportions indicated therein. First of all, maleic anhydride (MAn), adipic acid (AD), and 1,6-hexanediol (HD) are charged to a 4-liter reactor made from stainless steel and equipped with a column, a condenser, and a water separator. Subsequently, 3% of xylene is added as an entrainer, and 0.1% of methylhydroquinone (the percentage figures are based on the amount of MAn, AD and HD used). The resulting reaction mixture is heated under lean air over the course of 5 hours. Throughout the reaction time, the temperature of the reaction mixture does not exceed 230° C. When an acid number of 2 mg KOH/g is reached, the reaction mixture is cooled to 80° C. The characteristic data for the resulting alpha,omega-hydroxy-functionalized oligoesters are as follows:

OH number: 65 mg KOH/g

Number-average molecular weight: 1412 g/mol

Weight-average molecular weight: 3313 g/mol

Theoretical carbon-carbon double bond content: 1.86 mmol/g

TABLE 1

Amounts of substance of the reactants for use, in mol.

| | Raw material | Amount of substance |
|---|---|---|
| 1 | MAn | 5.05 |
| 2 | AD | 5.53 |
| 3 | HD | 14.46 |
| Solids content [%] | | 97 |

Example B: Preparation of an Inventive Additive (A1)

A steel reactor equipped with a reflux condenser and a thermometer is charged with 27.4 parts of 3-isocyanatopropyltriethoxysilane from ABCR GmbH & Co. KG (European dispatch of Gelest INC. products), 9.4 parts of butyl acetate, 0.2 part of 1,4-diazabicyclo[2.2.2]octane, and 2.2 parts of triethyl orthoformate. From a dropping funnel, subsequently, a mixture of 46.3 parts of the alpha,omega-hydroxy-functionalized oligoester (example A) and 14.5 parts of butyl acetate is added dropwise under a nitrogen atmosphere, with stirring. After 6 hour stirring at 70-80° C., the NCO value is verified by titrimetry according to DIN EN ISO 11909 (date: May 2007) and the reaction is continued until an NCO value of 0 is found. The inventive additive A1 has a nonvolatiles content of 71.8 wt %.

I) Refinish on Utility Vehicles

I.1) Preparation of a Solventborne Primer Surfacer Comprising Additive (A1)

A commercial primer surfacer was used. It is composed of the three components primer surfacer component, curing agent, and diluent. The respective compositions of these components are reproduced in table 2. The primer surfacer, curing agent, and diluent components are used in a ratio of 100:19.5:16, the ratio being based on the weight of the components. This gives the total amount of the primer surfacer. In each case, 0, 2, 4 and 6 wt % of the inventive additive (A1) is used, based on the total amount of the primer surfacer. A laboratory stirrer (260-1820 rpm) is employed for mixing. Additive A1 is added to the curing component.

TABLE 2

Composition of the primer surfacer used (primer surfacer component, curing agent, diluent).

| Curing agent | | Primer surfacer component | | Diluent | |
|---|---|---|---|---|---|
| Component | wt % | Component | wt % | Component | wt % |
| HDI-Basonat HI 190 B/S, 90% SN | 50.5 | Commercial dispersion of an OH-functional acrylate resin in organic solvents | 23.9 | 1-Methoxypropyl acetate | 46.5 |
| Xylene | 5.0 | Xylene | 2.0 | Butyl acetate 98-100% | 30.0 |
| Butyl acetate 98-100% | 23.7 | Solvent naphtha | 3.7 | Xylene | 20.0 |
| 1-Methoxypropyl acetate | 9.0 | Nuosperse FA 601 | 0.2 | Butyl glycol acetate | 2.0 |
| Silquest A-187 | 3.6 | 1-Methoxypropyl acetate | 6.7 | Ethyl 3-ethoxypropionate | 1.5 |
| Baysilon OL 44 | 0.7 | Aerosil 380 | 0.2 | | |
| Activator | 7.5 | Bentone 34, 100% | 1.7 | | |
| | | Lamp black-101 | 0.1 | | |
| | | Bayferrox 920 | 1.8 | | |
| | | Incomp KL 30 | 6.5 | | |
| | | Heucophos ZP0 | 12.4 | | |
| | | Luzenac 10MO | 9.2 | | |
| | | Titanium rutile | 12.5 | | |
| | | Shieldex AC 3 | 6.6 | | |
| | | Butyl glycol acetate | 1.5 | | |
| | | 1-Methoxypropyl acetate | 2.7 | | |
| | | Xylene | 0.4 | | |
| | | Leveling agent | 0.5 | | |
| | | Baysilone Fluid OL-44 | 0.1 | | |
| | | Epoxy resin | 8.6 | | |

Silquest A-187: gamma-glycidyloxypropyltrimethoxy-silane,
Baysilon OL 44: Surface additive,
activator: DBTL solution (1 wt % DBTL) in xylene/butyl acetate,
Nuosperse FA 601: wetting and dispersing agent,
Aerosil 380: hydrophilic fumed silica,
Bentone 34: rheological additive,
Russ flamm - 101: carbon black pigment,
Bayferrox 920: yellow iron pigment,
Incomp KL 30: mineral based on talc and dolomite,
Heucophos ZP0: anticorrosion pigment,
Luzenac 10MO: magnesium silicate,
Shieldex AC 3: anticorrosion pigment.

I.2) Production of Coated Substrates

Substrates used were aluminum panels, each in the form of test plates with a size of 20×10×0.45 cm. The panels were first of all abraded. This was done using P240 grade abrasive paper. Shortly before the application of the primer surfacer, the primer surfacer component, curing agent, and diluent were stirred together homogeneously using a wooden spatula. Application was by pneumatic spraying. It was followed by drying of the resulting primer surfacer film at room temperature for 60 minutes. Then a commercial topcoat material was applied by pneumatic spraying. This was followed by drying at room temperature for 10 minutes, after which primer surfacer film and topcoat film were cured jointly at a substrate temperature of 60° C. in a forced air oven for 30 minutes. In the resulting substrate, the primer surfacer coat had a dry film thickness of 77 micrometers and the topcoat had a dry film thickness of 75 micrometers.

The commercial topcoat material is composed of the three components topcoat component, curing agent, and diluent. The topcoat, curing agent, and diluent components are used in a ratio of 100:19.5:16, the ratio being based on the weight of the components. The respective compositions of these components for preparing the topcoat material are reproduced in table 3.

TABLE 3

Composition of the topcoat used (topcoat component, curing agent, diluent).

| Curing agent | | Topcoat component | | Diluent | |
| --- | --- | --- | --- | --- | --- |
| Component | wt % | Component | wt % | Component | wt % |
| HDI-Desmodur N3600 | 90 | Polyester 3.5 VOC | 12.4 | 1-Methoxypropyl acetate | 6 |
| Butyl acetate 98-100% | 10 | Acetylacetone | 2.2 | Butyl acetate 98-100% | 50 |
| | | Benzoic acid D | 0.4 | Xylene | 15 |
| | | Methyl isobutyl ketone | 1 | Butyl glycol acetate | 3 |
| | | BYK-331 100% | 0.08 | Ethyl ethoxypropionate | 1 |
| | | BYK-358 N, 52% | 0.1 | Solvent naphtha 160/180 | 13 |
| | | Tinuvin 292 | 0.31 | White spirit 135/180 | 10 |
| | | Tinstab BL 277 100% | 0.04 | Dipentene | 2 |
| | | BYK 054 | 0.18 | | |
| | | Disparlon 9050 | 0.26 | | |
| | | Xylene | 3 | | |
| | | Butyl acetate 98-100% | 4.2 | | |
| | | 1-Methoxypropyl acetate | 0.71 | | |
| | | Acrylique 324 New Process BASF | 21.1 | | |
| | | Acrylique TSA UNO BASF | 14.32 | | |
| | | Bentone 34, 100% | 0.2 | | |
| | | Aerosil R972 | 0.3 | | |
| | | Disperbyk-180 | 0.9 | | |
| | | Titanium rutile, Tiona 595 | 37.3 | | |
| | | Solvent naphtha 165/185 | 0.9 | | |
| | | Additive M-P-A 2000X, 20% in xylene | 0.001 | | |
| | | Disperbyk-111 | 0.003 | | |
| | | Bayferrox 3920 | 0.11 | | |
| | | Disperbyk-166, 30% methylpropyl acetate/butyl acetate 1:4 | 0.001 | | |
| | | Spezialschwarz 100 carbon black | 0.003 | | |
| | | Activator | 0.00015 | | |

Polyester 3.5 VOC is a commercial, OH-functional polyester (dispersion in organic solvents).

Acrylique 324 New Process BASF is a conventional dispersion of an OH-functional OH-acrylate in organic solvents.

Acrylique TSA UNO BASF is likewise a conventional dispersion of an OH-functional OH-acrylate in organic solvents.

The "activator" is a catalyst.

I.3) Investigation of the Adhesion Properties

The adhesion properties of the coatings produced were investigated by cross-cut (DIN EN ISO 2409; date: April 2010) after four different aging conditions. For each primer surfacer composition, characterized by its additive content (no additive, 2 wt %, 4 wt %, and 6 wt %), a total of two samples were produced and were each investigated individually. From the results obtained, the average was formed for each primer surfacer composition.

The first aging condition relates to storage at 40° C. for 16 hours. For the three further aging conditions, the samples were stored for 10 days in a conditioning chamber (CC) at 100% humidity and 40° C. (constant conditions test according to DIN EN ISO 6270-2 CH; date: September 2005). The adhesion of the samples was then investigated 1 hour, 3 hours, and 24 hours after removal from the conditioning chamber.

The results obtained are set out in table 4. The entry "none" there means that delamination occurred neither between substrate and primer surfacer nor between primer surfacer and topcoat. Furthermore, the entry "Ps/Tc" means that delamination was observed between primer surfacer and topcoat.

The adhesion was evaluated using a rating system with ratings from 0 to 5, with the rating 0 being awarded to coatings exhibiting no visible traces after the adhesion test (very good adhesion). The rating 5 was awarded to coatings which exhibited significantly detached regions after the adhesion test (inadequate adhesion).

From the results set out in table 4 it follows that a distinct improvement can be achieved in the adhesion through the use of the additive.

TABLE 4

Adhesion properties of the unadditized and additized primer surfacers.

| Aging-condition | no additive | 2 wt % additive | 4 wt % additive | 6 wt % additive |
|---|---|---|---|---|
| 16 h after 40° C. | 1 | 1 | 1 | 0 |
| Delamination between: | none | none | none | none |
| 1 h after CC | 3 | 3 | 0 | 1 |
| Delamination between: | Ps/Tc | Ps/Tc | none | none |
| 3 h after CC | 5 | 5 | 2 | 3 |
| Delamination between: | Ps/Tc | Ps/Tc | Ps/Tc | Ps/Tc |
| 24 h after CC | 4 | 3 | 1 | 2 |
| Delamination between: | Ps/Tc | Ps/Tc | Ps/Tc | Ps/Tc |

II) Automotive Refinish

II.1) Preparation of a Solventborne Primer Surfacer Comprising Additive (A1)

A commercial primer surfacer was used. It is composed of the three components primer surfacer component, curing agent, and diluent. The respective compositions of these components are reproduced below in table 5. The primer surfacer component, curing agent, and diluent components are used in a ratio of 100:17.5:13.5, the ratio being based on the weight of the components. This produces the total amount of the primer surfacer. Amounts in each case of 0, 2, 4, and 6 wt % of the bifunctional additive (A1) of the invention are used, based on the total amount of the primer surfacer. Additization is carried out using a laboratory stirrer (260-1820 rpm). Additive A1 is added to the curing component.

TABLE 5

Composition of the primer surfacer used (primer surfacer component, curing agent, diluent).

| Curing agent | | Primer surfacer component | | Diluent | |
|---|---|---|---|---|---|
| Component | wt % | Component | wt % | Component | wt % |
| HDI-Desmodur N3600 | 35.1 | Polyester 5085 | 19.03 | 1-Methoxypropyl acetate | 6 |
| Butyl acetate 98-100% | 41.1 | Acrylester 365 | 2.2 | Butyl acetate 98-100% | 50 |
| 1-Methyprop-2-yl acetate | 4.25 | BYK-P 104, 50% in xylene/DIBK, 9:1 | 0.23 | Xylene | 15 |
| Xylene | 5.65 | Bentone 34, 100% | 0.52 | Butyl glycol acetate | 3 |
| Ethyl ethoxypropionate | 1.6 | Butyl acetate 98-100% | 10.12 | Ethyl ethoxypropionate | 1 |
| Tinstab BL 277 100% | 0.06 | 1-Methoxypropyl acetate | 6.6 | Solvent naphtha 160/180 | 13 |
| Desmodur XP 2565, 80% butyl acetate | 12.3 | Aerosil R972 | 1.48 | White spirit 135/180 | 10 |
| | | Talc AT Extra, Micro | 5.15 | Dipentene | 2 |
| | | China Clay Polwhite B | 12.65 | | |
| | | Zinc phosphate PZ 20 | 10.2 | | |
| | | Tiona 595 | 10.54 | | |
| | | Bayferrox 306 | 1.27 | | |
| | | Blanc Fixe N | 11.6 | | |
| | | Zeeospheres G-400 | 5.15 | | |
| | | Xylene | 0.85 | | |
| | | Tinstab BL 277 100% | 0.1 | | |
| | | DOW E.R. 671 60% strength in xylene | 2.21 | | |
| | | Butyl glycol acetate | 0.1 | | |

Polyester 5085 is a conventional, OH-functional polyester (dispersion in organic solvents).
Acrylester 365 is a conventional dispersion of an OH-functional OH-acrylate in organic solvents.

II.2) Production of Coated Substrates

Substrates used were panels of steel, each in the form of test plates with a size of 20×10×0.3 cm. The panels were first of all abraded. This was done using P180 grade abrasive paper. Shortly before application of the primer surfacer, the primer surfacer, curing agent, and diluent components were stirred together homogeneously using a wooden spatula. First a commercial primer was applied, followed by drying at room temperature for 10 minutes. The primer surfacer was then applied by pneumatic spraying, followed by drying at room temperature for 10 minutes. The two films were then baked at a substrate temperature of 60° C. in a forced air oven for 25 minutes. The primer had a dry film thickness of 16 micrometers, and the primer surfacer coat a dry film thickness of micrometers. The primer surfacer was subsequently sanded manually (P400 sanding pad) and then cleaned of sanding residues by conventional diluted cleaner.

Next, a commercial basecoat material was applied, followed by drying at room temperature for 10 minutes. A commercial 2-component clearcoat material was then applied by pneumatic spraying, followed again by drying at room temperature for 10 minutes. The overall basecoat-clearcoat system was then baked at a substrate temperature of 60° C. in a forced air oven for 10 minutes. The basecoat had a dry film thickness of 15 micrometers, and the clearcoat a dry film thickness of 38 micrometers.

A commercial primer was used. It is composed of the three components millbase, curing agent, and diluent. The respective compositions of these components are reproduced below. The millbase, curing agent, and diluent components are used in a ratio of 100:35.8:8, the ratio being based on the weight of the components.

TABLE 6

Composition of the primer used (millbase component, curing agent, diluent).

| Millbase component | | Curing agent | | Diluent | |
| --- | --- | --- | --- | --- | --- |
| Component | wt % | Component | wt % | Component | wt % |
| Butanol | 5.6 | Ethanol | 27 | 1-Methoxyprop-2-yl acetate | 46.5 |
| n-Propanol | 21.8 | Isopropanol | 56 | Butyl acetate 98-100% | 30 |
| Isobutanol | 3 | Butanol | 13 | Xylene | 20 |
| Butyl acetate 98-100% | 8 | Phosphoric acid | 4 | Butyl glycol acetate | 2 |
| Mowital B 30H, 100% | 5.5 | | | Ethyl ethoxypropionate | 1.5 |
| Xylene | 7.8 | | | | |
| Parosin FE 45.5 | 6.3 | | | | |
| Phenodur PR 263 70% in butanol | 3.4 | | | | |
| Calcium naphthenate 4% Ca | 0.4 | | | | |
| Silica HDK T40 | 0.7 | | | | |
| Tiona 595 | 9.8 | | | | |
| Luzenac 10MO | 7.7 | | | | |
| Zinc oxide NC, 100% | 2.1 | | | | |
| Zinc phosphate PZ 20 | 5.7 | | | | |
| Bayferrox 3910 | 3.7 | | | | |
| Bayferrox 130BM | 0.07 | | | | |
| Lamp Black 101 powder | 0.07 | | | | |
| Plastopal H 73 IB/X 35:1 | 0.5 | | | | |
| Solution Ethylcellulose | 4 | | | | |
| Solution Aldehydique | 4.3 | | | | |

Plastopal H 73 IB/X 35:1 is a urea-formaldehyde resin.

Tiona 95 is rutile.

Phenodur PR 263 70% is a phenolic resin from Cytec.

A commercial basecoat material was used. It is composed of the two components mixing varnish and standardizing additive. The respective compositions of these components are reproduced below. The basecoat material is prepared using the mixing varnish and standardizing additive components in a ratio of 2:1, the ratio being based on the volume of the components.

TABLE 7

Composition of the basecoat material used.

| Mixing varnish | | Standardizing additive | |
|---|---|---|---|
| Component | wt % | Component | wt % |
| Conventional PU dispersion 1 | 72.8 | Water | 97.3 |
| Conventional PU dispersion 2 | 12 | Biocide | 0.2 |
| Conventional PU dispersion 3 | 1.6 | Pluriol P900 | 1 |
| Butyl glycol | 0.5 | Laponite RD | 1.5 |
| Alu Star | 6 | | |

TABLE 7-continued

Composition of the basecoat material used.

| Mixing varnish | | Standardizing additive | |
|---|---|---|---|
| Component | wt % | Component | wt % |
| Hydrolux 8154, 65% | | | |
| Alu Star | 1.4 | | |
| Hydrolux F90, 65% | | | |
| sec-Butanol | 3.7 | | |
| Raybo 61, 60% | 0.1 | | |
| TMDD BG 52 | 1.7 | | |
| Farbruβ FW 2 carbon black | 0.004 | | |
| Aerosil R972 | 0.5 | | |
| Bayferrox 3910/R | 0.04 | | |
| Lanco Pew 1555 | 0.65 | | |

Lanco Pew 1555 is a water-thinnable polyether wax from Lubrizol.

A commercial clearcoat material was used. It is composed of the three components millbase, curing agent, and diluent. The respective compositions of these components are reproduced below. The millbase, curing agent, and diluent components are used in a ratio of 100:50:8.6, the ratio being based on the weight of the components.

TABLE 8

Composition of the clearcoat material used (millbase component, curing agent, diluent).

| Millbase component | | Curing agent | | Diluent | |
|---|---|---|---|---|---|
| Component | wt % | Component | wt % | Component | wt % |
| Ethyl ethoxypropionate | 4 | 1-Methoxyprop-2-yl acetate | 3 | 1-Methoxypropyl acetate | 6 |
| Methyl isobutyl ketone | 6 | Butyl acetate 98-100% | 15 | Butyl acetate 98-100% | 50 |
| Commercial acrylate dispersion | 81 | Xylene | 10 | Xylene | 15 |
| Benzoic acid D | 1 | Methyl isobutyl ketone | 13 | Butyl glycol acetate | 3 |
| Tinuvin 5941-R | 2.2 | DBTL | 0.12 | Ethyl ethoxypropionate | 1 |
| Commercial acrylate dispersion | 3 | Benzoic acid D | 2.5 | Solvent naphtha 160/180 | 13 |
| Byk 325, 52% | 0.2 | Water scavenger | 0.35 | White spirit 135/180 | 10 |
| Tinstab BL 277 100% | 2.2 | HDI-Desmodur N3600 | 56 | Dipentene | 2 |
| Butyl acetate 98-100% | 2.6 | | | | |

II.3) Investigation of the Adhesion Properties

The adhesion properties of the coatings produced were investigated as described under I.3) by means of cross-cut (DIN EN ISO 2409; date: April 2010) after four different aging conditions.

The results obtained are set out in table 9. The entry "none" here means that delamination occurred between the coats. Furthermore, the entry "Bc/Ps/Tc" means that delamination was observed not only between basecoat and primer surfacer but also between primer surfacer and primer. The entry "Bc/Ps/Su" means that delamination was observed not only between basecoat and primer surfacer but also between primer surfacer, primer, and basecoat. The entry "Ps/Pr", finally, means that delamination occurred exclusively between primer surfacer and primer.

The adhesion was evaluated using a rating system with ratings from 0 to 5, with the rating 0 being awarded to coatings exhibiting no visible traces after the adhesion test (very good adhesion). The rating 5 was awarded to coatings which exhibited significantly detached regions after the adhesion test (inadequate adhesion).

TABLE 9

Adhesion properties of the unadditized and additized primer surfacers.

| Aging condition | no additive | 2 wt % of additive | 4 wt % of additive | 6 wt % of additive |
| --- | --- | --- | --- | --- |
| 16 h after 40° C. Delamination between: | 4.5 Bc/Ps/Pr | 2.5 Bc/Ps/Su | 1.5 Bc/Ps/Pr | 0.5 Bc/Ps/Su |
| 1 h after CC Delamination between: | 1.5 Bc/Ps/Pr | 0.5 Bc/Ps/Pr | 2.5 Bc/Ps/Pr | 3 Bc/Ps/Pr |
| 3 h after CC Delamination between: | 2.5 Bc/Ps/Pr | 0 none | 1 Bc/Ps/Pr | 0 none |
| 24 h after CC Delamination between: | 1 Ps/Pr | 1 Bc/Ps/Pr | 0.5 Bc/Ps/Pr | 0.5 none |

From the results set out in table 9, it follows that a distinct improvement in adhesion is achievable through the use of the additive.

The invention claimed is:

1. A solventborne primer surfacer comprising at least one organic solvent and at least one additive preparable by reacting
   (a) at least one alpha,omega-hydroxy-functionalized oligoester which possesses the following structural formula (I):

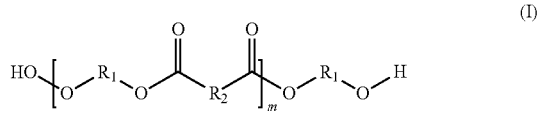

(I)

where
the radicals $R_1$ independently of one another are a linear or cyclic alkylene radical,
the radicals $R_2$ independently of one another are an alkylene or alkenylene radical, the ratio of alkylene to alkenylene radicals being such that the alpha,omega-hydroxy-functionalized oligoester of the structural formula (I) possesses a theoretical carbon-carbon double bond content of 1 to 2.5 mmol/g, and
the index m is such that the number-average molecular weight of the alpha,omega-hydroxy-functionalized oligoester of the structural formula (I) is 1000 to 3000 g/mol,
wherein the alpha,omega-hydroxy-functionalized oligoester possesses an OH number of 30 to 160 mg KOH/g, and a weight-average molecular weight of 2800 to 10 000 g/mol, and
(b) at least one alkoxysilane of the structural formula (II)

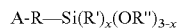

where
A is an OH-reactive functional group,
R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms,
the radical R' is a $C_1$ to $C_{12}$ alkyl radical,
R" is a methyl or ethyl radical, and
x is 0 to 2,
with the proviso that at least 90 mol % of all the OH groups of the alpha,omega-hydroxy-functionalized oligoester have been reacted with an OH-reactive functional group A, and,
the sum of the weight percentage fractions of all additives of the invention is 0.5 to 10 wt %, based on the total amount of the solventborne primer surfacer.

2. The solventborne primer surfacer as claimed in claim 1, wherein the alpha,omega-hydroxy-functionalized oligoester is prepared using at least one saturated linear aliphatic dicarboxylic acid or anhydride thereof, at least one mono-unsaturated linear aliphatic dicarboxylic acid or anhydride thereof, and at least one saturated aliphatic diol.

3. The solventborne primer surfacer of claim 1, wherein the sum of the weight percentage fractions of all the additives is 1.5 to 7.5 wt %, based on the total amount of the solventborne primer surfacer.

4. The solventborne primer surfacer as claimed in claim 1, wherein the radicals $R_1$ are linear alkylene radicals having 6 to 10 carbon atoms.

5. The solventborne primer surfacer of claim 1, wherein the radicals $R_2$ are linear alkylene radicals having 4 to 8 carbon atoms or linear alkenylene radicals having 2 to 4 carbon atoms.

6. The solventborne primer surfacer of claim 1, wherein the alkoxysilane possesses the general structural formula (II.1)

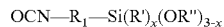

where
$R_1$ is a $C_2$ to $C_{12}$ alkylene radical, a $C_2$ to $C_{12}$ alkenylene radical, or a polyunsaturated $C_4$ to $C_{12}$ alkylene radical,
the radical R' is a $C_1$ to $C_{12}$ alkyl radical,
R" is a methyl or ethyl radical, and
x is 0 to 2.

7. The solventborne primer surfacer as claimed in claim 6, wherein $R_1$ is a $C_2$ to $C_6$ alkylene radical.

8. The solventborne primer surfacer as claimed in claim 6, wherein x=0.

9. The solventborne primer surfacer of claim 1, wherein the oligoester (a) is obtained by reacting components that comprise at least one saturated linear aliphatic dicarboxylic acid and at least one mono- or polyunsaturated linear aliphatic dicarboxylic acid.

10. The solventborne primer surfacer of claim 1, wherein the oligoester (a) is obtained by reacting components that comprise at least one saturated linear aliphatic dicarboxylic acid and at least one mono- or polyunsaturated linear aliphatic dicarboxylic acid, and wherein a molar ratio of saturated dicarboxylic acid to mono- and/or polyunsaturated aliphatic dicarboxylic acid is from 0.5:1.5 to 1.5:0.5.

11. The solventborne primer surfacer of claim 1, wherein the at least one organic solvent is a member selected from the group consisting of aliphatic hydrocarbons, aromatic hydrocarbons, ketones, esters, ethers, alcohols, and mixtures thereof.

12. A process for producing a multicoat paint system on a substrate, the process comprising
(A) applying the primer surfacer of claim 1, and (B) applying a further coating material.

13. The process as claimed in claim 12, wherein
i. the primer surfacer film obtained in step (A) is dried,
ii. the coating material in step (B) is a topcoat material, and
iii. the dried primer surfacer film and the topcoat film obtained in step (B) are jointly cured.

14. A multicoat paint system producible by the process as claimed in claim 13.

15. The process as claimed in claim 12, wherein
i. a primer is applied to the substrate before the application of the primer surfacer in step (A), and the resulting primer film is dried,
ii. the dried primer film and the primer surfacer film obtained in step (A) are jointly cured,
iii. the further coating material in step (B) is a basecoat material, and is applied to the cured primer surfacer film and subsequently dried, and
iv. a clearcoat material is applied to the dried basecoat film, and the dried basecoat film and the resulting clearcoat film are jointly cured.

16. A multicoat paint system producible by the process as claimed in claim 15.

17. A process for improving adhesion of a primer surfacer, the process comprising formulating at least one organic solvent and at least one additive into a solventborne primer surfacer, wherein the at least one additive is preparable by reacting
(a) at least one alpha,omega-hydroxy-functionalized oligoester which possesses the following structural formula (I):

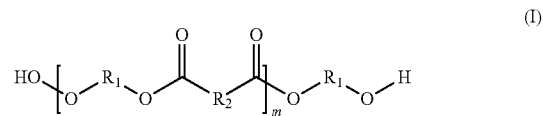

where
the radicals $R_1$ independently of one another are a linear or cyclic alkylene radical,
the radicals $R_2$ independently of one another are an alkylene or alkenylene radical, the ratio of alkylene to alkenylene radicals being such that the alpha,omega-hydroxy-functionalized oligoester of the structural formula (I) possesses a theoretical carbon-carbon double bond content of 1 to 2.5 mmol/g, and
the index in is such that the number-average molecular weight of the alpha,omega-hydroxy-functionalized oligoester of the structural formula (I) is 1000 to 3000 g/mol,
wherein the alpha,omega-hydroxy-functionalized oligoester possesses an OH number of 30 to 160 mg KOH/g, and a weight-average molecular weight of 2800 to 10 000 g/mol, and
(b) at least one alkoxysilane of the structural formula (II)

$$A\text{-}R\text{—}Si(R')_x(OR'')_{3-x}$$

where
A is an OH-reactive functional group,
R is an aliphatic radical having 2 to 12 carbon atoms, a cycloaliphatic radical having 3 to 12 carbon atoms, an aromatic radical having 6 to 12 carbon atoms, or an araliphatic radical having 7 to 18 carbon atoms,
the radical R' is a $C_1$ to $C_{12}$ alkyl radical,
R" is a methyl or ethyl radical, and
x is 0 to 2,
with the proviso that at least 90 mol % of all the OH groups of the alpha,omega-hydroxy-functionalized oligoester have been reacted with an OH-reactive functional group A,
and,
the sum of the weight percentage fractions of all additives of the invention is 0.5 to 10 wt %, based on the total amount of the solventborne primer surfacer.

18. The process of claim 17, wherein the at least one organic solvent is a member selected from the group consisting of aliphatic hydrocarbons, aromatic hydrocarbons, ketones, esters, ethers, alcohols, and mixtures thereof.

* * * * *